Feb. 16, 1965   T. L. JERNIGAN ETAL   3,169,494
MACHINE AND METHOD FOR INSERTING STICKS IN BARS
Original Filed June 23, 1961   2 Sheets-Sheet 1
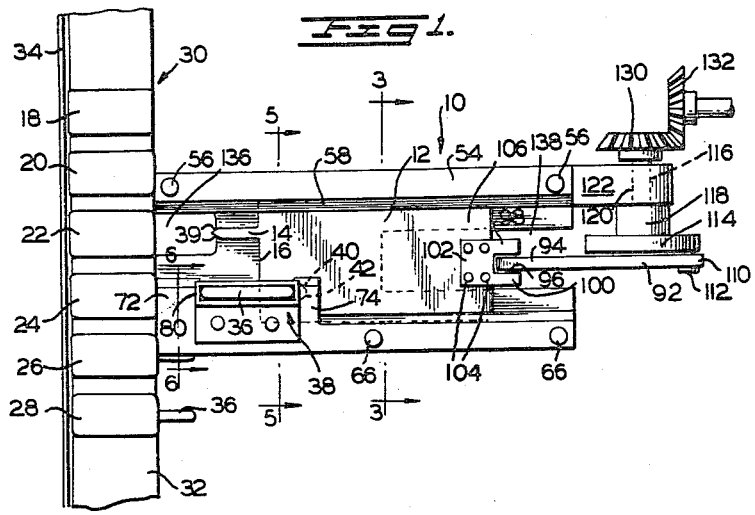
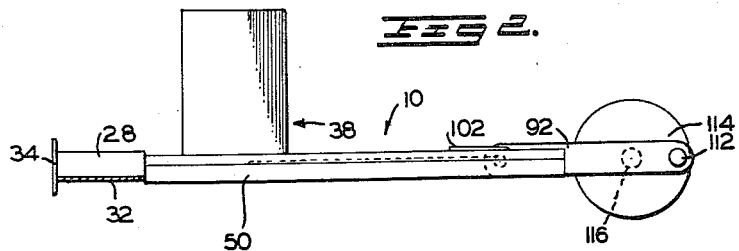
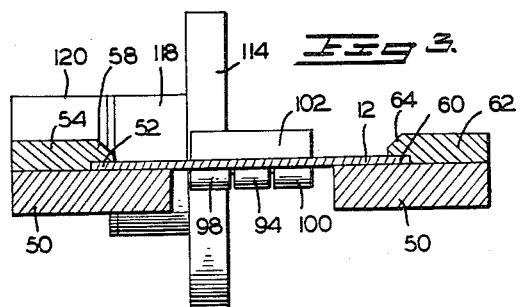
INVENTORS
THOMAS L. JERNIGAN
CHRISTIAN K. NELSON
BY *Browne, Schuyler & Beveridge*
ATTORNEYS

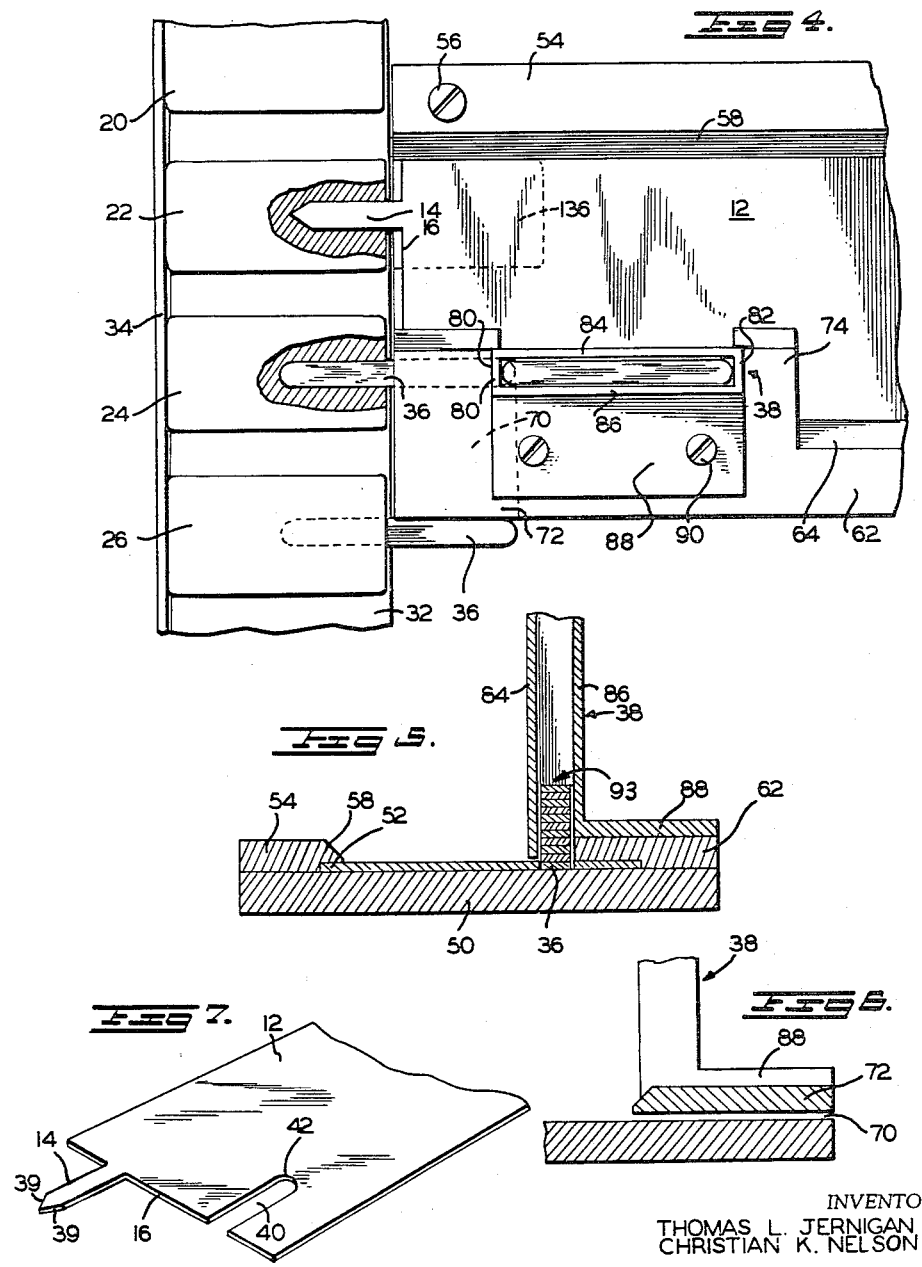

3,169,494
MACHINE AND METHOD FOR INSERTING
STICKS IN BARS
Thomas L. Jernigan, Richmond, Va., and Christian K. Nelson, Los Angeles, Calif., assignors to Eskimo Pie Corporation, Richmond, Va., a corporation of Delaware
Continuation of application Ser. No. 119,240, June 23, 1961. This application Mar. 11, 1963, Ser. No. 264,282
10 Claims. (Cl. 107—54)

This invention relates to a machine and method for automatically inserting sticks into bars. More particularly, this invention relates to a machine and method for successively forming holes in a series of bars, such as frozen dessert bars, and subsequently inserting handle sticks in the holes in the bars.

The present application is a continuation of our application Serial No. 119,240 for Machine for Inserting Sticks in Bars, filed June 23, 1961, and now forfeited.

Heretofore, machines have been provided for supplying sticks in frozen dessert bars to be used as handles. Some prior machines have had daggers for preforming holes in frozen ice cream bars, and mechanism for subsequently inserting sticks in the holes. Some such machines have been complicated and bulky.

The present invention resides in the concept of a machine of simple and economical construction for successively forming holes in frozen dessert bars and inserting handle sticks into these holes.

The machine of the invention is constructed to supply sticks to a moving row of frozen dessert bars. The machine is constructed to operate at uniform speeds and frequencies and to be driven in timed relation with a conveyor moving a line of bars past the machine.

For a better understanding of the invention and its other objects, advantages and details, reference is now made to the presently preferred embodiment of the invention which is shown, for purposes of illustration only, in the accompanying drawings.

In the drawings:

FIGURE 1 is a top plan view of the presently preferred embodiment of the invention showing the movable parts in retracted position;

FIGURE 2 is a side elevation of the stick inserting machine shown in FIGURE 1 with the parts in retracted position;

FIGURE 3 is an enlarged detailed transverse sectional view taken along line 3—3 in FIGURE 1;

FIGURE 4 is an enlarged fragmentary plan view of the left-hand end of the mechanism viewed in FIGURE 1 with the movable parts in their extended or forward position;

FIGURE 5 is an enlarged detailed sectional view taken along the line 5—5 of FIGURE 1;

FIGURE 6 is an enlarged detailed fragmentary sectional view taken along the line 6—6 of FIGURE 1; and, FIGURE 7 is a fragmentary perspective view of the forward end of the slide plate.

Briefly stated, the illustrated machine of the invention includes a slide or plate slidably positioned in a track. The plate is reciprocated toward and away from a row of moving frozen dessert bars. The plate has a dagger extending therefrom for forming a hole in each of the frozen dessert bars. The plate also has a slot formed therein for receiving and advancing a stick into the hole preformed in each frozen dessert bar. A magazine is mounted over the plate in a position to successively deliver sticks to the slot formed in the slide plate.

Mechanism, including a crank and connecting rod is provided for reciprocating the plate. The crank is in the form of a flywheel which tends to make uniform the frequency of reciprocation of the plate. Thereby, the plate can be driven in timed relation with the motion of a conveyor moving the bars past the plate.

As viewed in the drawings, the stick inserting machine of the invention 10 includes a slide or plate 12 having a dagger or punch 14 extending from its edge 16 toward the line of frozen dessert bars 18, 20, 22, 24, 26, and 28, moving along on conveyor 30 past the stick-inserting machine 10.

The conveyor 30 includes a bed 32 and a vertical back wall 34 for holding the bars 18–28 against undesired movement off the bed 32 when the dagger 14 forms the holes in the bars and when the sticks are inserted.

The dagger 14 forms a hole in each of the frozen dessert bars 18–28 for receiving a stick 36, to be used as a handle. Each stick is delivered from a vertical magazine 38 by the plate 12. At its outer end, the dagger 14 has a pair of slanted edges 39 converging to a point.

When the plate 12 is in the retracted position shown in FIGURE 1, the lowermost stick 36 in the magazine 38 drops into a slot 40 formed in the plate 12, as seen in FIGURES 5 and 7. The rear, curved surface 42 of slot 40 engages the stick 36 and moves it into the preformed hole in the frozen dessert bar. The width and thickness of dagger 12 are somewhat less than the corresponding dimensions of stick 36 so as to provide for a tight fit of the stick in the frozen dessert bar.

The plate 12 slides on a table 50 mounted on a base (not shown). Edge 52 of plate 12, as viewed in FIGURES 3 and 5, slides in a track formed between the table and guide panel 54 secured to table 50 by bolts 56 and having a beveled projection 58 of diminished thickness extending from its inner edge.

Similarly, the other edge 60 of the plate 12, as seen in FIGURE 3, slides in a track formed between the table 50 and a guide panel 62 having a beveled projection 64 of diminished thickness extending from its inner edge. The guide panel 62 is secured by bolts 66 to the table 50.

As viewed in FIGURES 4 and 6, the guide panel 62 is relieved or cut away at its end nearest the conveyor 30 on its lower face to provide an opening 70 for the passage of the sticks 36 which have just previously been inserted in the bars 18–28. This is accomplished by forming the projection 72 of diminished thickness. The opening 70 permits the sticks to pass from the machine 10.

The magazine 38 is mounted over an aperture formed between projection 72 and a projection 74 extending from guide panel 62.

The magazine 38 has a hollow rectangular cross-section and includes end walls 80 and 82, side walls 84 and 86, and a bottom flange 88 joined to side wall 86 and secured by screws 90 to the guide panel 62. As seen in FIGURE 5, the magazine 38 is positioned so that the lowermost stick in the stack 93, falls into the slot 40 when the plate is in its retracted position.

For reciprocating the plate 12, a connecting rod 92 has one end 94 apertured and receiving a pin 96 extending between legs 98 ann 100 of a forked member 102 secured by screws 104 to the rear portion 106 of the slide plate 12.

The opposite end 110 of the connecting rod 92 has a hole formed therein receiving a crank pin 112 secured to a rotary wheel 114 which acts as both a crank and a flywheel. The wheel is fixed to a shaft 116. The wheel 114 has a hub 118 integral therewith. The shaft 116 is journaled in a bearing 120 formed in an enlarged end of an arm 122 fixed to the table 50. The shaft 116 has a beveled gear 130 fast to one end and meshing with a beveled gear 132, driven by an appropriate power source in timed relation to the driving of conveyor 30.

As seen in FIGURES 1 and 3, the table 50 has a hole 135 formed therein so that any bits of frozen dessert stripped from the dagger 14 upon its withdrawal can fall into an appropriate receptacle (not shown) below. Also, the table 50 has a rectangular aperture 138 formed therein at its rearward portion to permit action of the connecting rod 92.

In operating the above described embodiment of the invention, a row of frozen dessert bars 18–28, such as frozen ice cream bars, frozen ice milk bars, or frozen sherbet bars, are moved on conveyor 30 past the stick inserting machine 10. The shaft 116 is driven in timed relation to the conveyor 30. The crank wheel 114 oscillates connecting rod 92 which reciprocates plate 12. The flywheel 114 tends to make constant the speed of shaft 116 and hence the frequency of reciprocation of plate 12. As the slide or plate 12 moves from the position shown in FIGURES 1 and 2 to the position shown in FIGURE 4, the dagger 12 enters the frozen bar 22 and forms a hole therein.

At the same stroke, a stick 36 is pushed by the rear surface 42 of slot 40 into the hole in bar 24, referring to FIGURE 4, which was preformed upon the previous stroke of the plate 12.

The plate 12 is then withdrawn. As the dagger 14 is withdrawn, the bar 22 is restrained from moving with the dagger by the engagement of the bar with table 50 and/or guide panel 54. Thereafter, the conveyor 30 moves the line of bars forward to present the next bar 20 for engagement by the dagger 14 and the bar 22 for receiving a stick 36. In this movement, the bar 24 is moved from the stick-inserting machine 10, with the stick 36 in bar 24 passing through the opening 70.

Thus it will be seen that the invention provides a device of simple construction for economically and efficiently forming holes in a series of bars and inserting handle sticks therein.

While a presently preferred embodiment of the invention has been illustrated and described, it will be recognized that the invention can be otherwise variously embodied and practiced within the scope of the following claims.

What is claimed is:

1. Apparatus for forming holes in frozen dessert bars and inserting handle sticks therein, said apparatus comprising a conveyor for moving a row of frozen dessert bars and a machine for forming holes in said bars and inserting sticks in said holes one after another, said machine being located adjacent said conveyor, said machine including a plate movable toward and away from said conveyor, said plate having a pointed dagger extending therefrom for forming a hole in each of said bars, said plate having a slot formed therein for receiving and advancing a stick toward said conveyor; a table slidably supporting said plate, a pair of guide panels positioned on opposite edges of said table, said guide panels having projections extending over the edges of said plate to define tracks for the sliding of said plate; a vertical, hollow magazine mounted on one said guide panel, said magazine being located over the position occupied by the slot in said plate when said plate is in its position farthest from said conveyor, said one guide panel having an opening formed between its lower surface and the table at the end nearest said conveyor, said opening being adapted for the movement of the sticks from the machine after insertion in frozen dessert bars; a connecting rod having one end pivotally connected to said plate, a crank wheel, said connecting rod having its other end pivotally connected to said crank wheel, said crank wheel having sufficient weight to function as a flywheel.

2. A process for inserting handles into confectionery bars comprising the steps of arranging each of a plurality of bars on a movable support to be spaced apart equally, moving said bar supports at a constant velocity along a path passing a fixed point, abreast said point periodically moving a dagger longitudinally toward said conveyor in timed relation to the conveyor movement a distance to penetrate into each successive bar a substantial distance in a direction transverse to said path and then withdrawing said dagger while restraining the penetrated bar from moving transversely to said path on its support, thereby producing a hole in each bar moving beyond said point, and positioning a handle parallel to and spaced from said dagger the distance between adjacent confections with the forward end of said handle spaced from said path no less than the separation between said dagger and said path, simultaneously with each insertion of said dagger, pushing said handle along its length the same direction and distance as said dagger movement to insert the handle into the hole of the last bar having passed beyond said point, said handle being slightly larger in diameter than said hole.

3. A process for continuously producing confecionery bars having handles protruding from one end thereof, comprising the steps of substantially continuously moving a conveyer carrying a succession of equally spaced bars along a path past a first point and a second point spaced thereafter, abreast of said first point in timed relationship to said conveyer motion periodically moving a dagger transversely of said path toward and away from said conveyer a distance to penetrate a substantial distance into and carve a hole in the end of each successive bar passing thereby, and abreast of said second point positioning a handle perpendicularly of said path with an end separated from said path substantially no less than the separation between the outer pointed extremity of said dagger and said path, and moving said handle lengthwise toward said conveyer a distance equal to that moved by said dagger and in timed relationship to said dagger movement to insert the handle into the carved hole of each successive bar passing thereby.

4. The process of claim 3 wherein said timed relationship of inserting said handle is simultaneous with each motion of said dagger toward said conveyor.

5. The process of claim 4 wherein the distance between said first and second points is the spacing between successive bars on said conveyer.

6. The process of claim 3 wherein said conveyer is moved at a constant velocity and the movement of said dagger and handle is simultaneous.

7. Apparatus for inserting stick handles into confections comprising:

a conveyor moving a succession of equally spaced confections along an established path, a plate slidably mounted for movement of a leading edge toward and away from said conveyor and established path, said plate containing a slot extending rearwardly from said leading edge to contain a rear portion of a stick handle whose remaining portion extends ahead of said leading edge to place the outer stick extremity a given distance from said established path, a dagger on said plate extending forwardly from said leading edge a distance that the separation between said established path and the outer pointed extremity of said dagger before it reaches said path is substantially no greater than said given distance, the axis of said dagger being parallel to and spaced from said slot by the interval between confections, means for reciprocating said plate between a retracted position away from said established path in which said dagger clears the confections and an extended position nearer said established path in which said dagger penetrates into a confection a substantial distance to carve a hole into which the outer extremity of a stick handle held within said slot is subsequently inserted, and a magazine holding a vertical stack of stick handles mounted immediately above said plate with the rear portion of the lowest stick handle fitting into said slot when said plate is in said retracted position.

8. Apparatus for inserting stick handles into confections comprising:
- a conveyor moving a succession of equally spaced confections past a fixed location,
- a plate at said fixed location slidably mounted for movement of a leading edge toward and away from said conveyor,
- said plate containing a slot extending rearwardly into said plate from said leading edge to contain a rear portion of a stick handle whose remaining portion protrudes ahead of said leading edge a predetermined distance, the axis of said slot being parallel to the direction of motion of said plate,
- a dagger extending forwardly of said leading edge with the pointed, outer extremity thereof being forward of said leading edge at least said predetermined distance, the axis of said dagger being parallel to that of said slot and spaced therefrom the intervals between confections,
- means for reciprocating said plate between a retracted position in which said dagger is clear of the line of confections on said conveyor and an extended position in which said dagger penetrates a substantial distance into a confection on the conveyor to carve a hole therein and, simultaneously therewith, the outer portion of a stick handle held in said slot is inserted into a confection on said conveyor having a previously carved hole, and
- a magazine holding a vertical stack of stick handles and mounted immediately above said plate with the rear portion of lowest stick handle fitting into said slot when said plate is in said retracted position.

9. Apparatus for inserting stick handles into confections comprising:
- a conveyor moving a succession of equally spaced confections past a fixed location along an established path,
- a plate at said fixed location slidably mounted for moving a leading edge toward and away from said conveyor,
- said plate containing a slot extending rearwardly into said plate from said leading edge to contain a rear portion of a stick handle with the remainder thereof protruding ahead of said leading edge a predetermined distance, the axis of said slot being parallel to the direction of motion of said plate and intersecting said established path,
- a dagger on said plate extending forwardly of said leading edge with the pointed, outer extremity thereof being forward of said leading edge at least said predetermined distance, the axis of said dagger being parallel to that of said slot, being spaced therefrom equal to a spacing between confections and intersecting said fixed path,
- means for reciprocating said plate between a retracted position in which said dagger is clear of the line of confections on said conveyor and an extended position in which said dagger penetrates a substantial distance into a confection on the conveyor to carve a hole therein and, simultaneously therewith, the outer portion of a stick handle in said slot is inserted into a confection on said conveyor having a previously carved hole, and
- a magazine holding a vertical stack of stick handles mounted immediate above said plate with the rear portion of the lowest stick handle fitting into said slot when said plate is in said retracted position.

10. An apparatus for inserting stick handles into hard frozen confections comprising:
- a conveyor moving a succession of equally spaced confections along a straight path past a fixed location,
- a flat plate at said fixed location slidably mounted for movement of a leading edge toward and away from said conveyor,
- said plate containing a slot extending rearwardly into said plate from said leading edge to contain a rear portion of a stick handle with the remainder thereof protruding ahead of said leading edge a predetermined distance, the axis of said slot being parallel to the direction of motion of said plate,
- a dagger on said plate extending forwardly of said leading edge with the pointed, outer extremity thereof being forward of said leading edge at least said predetermined distance, the axis of said dagger being parallel to that of said slot and spaced therefrom the interval between confections,
- means for reciprocating said plate between a retracted position in which said dagger is clear of the line of confections on said conveyor and an extended position in which said dagger penetrates a substantial distance into a confection on a conveyor to carve a hole therein and, simultaneously therewith, the outer portion of a stick handle in said slot is inserted into a confection on said conveyor having a previously carved hole, and
- a magazine holding a vertical stack of stick handles mounted immediately above said plate with the rear portion of the lowest stick handle fitting into said slot when said plate is in said retracted position.

References Cited in the file of this patent

UNITED STATES PATENTS

| | | |
|---|---|---|
| 252,379 | Hubbard | Jan. 17, 1882 |
| 664,908 | Swinehart | Jan. 1, 1901 |
| 1,594,418 | Krout | Aug. 3, 1926 |
| 1,922,563 | West | Aug. 15, 1933 |
| 1,963,768 | West | June 19, 1934 |
| 2,152,214 | Sattler | Mar. 28, 1939 |
| 2,929,340 | Topfer | Mar. 22, 1960 |

FOREIGN PATENTS

| | | |
|---|---|---|
| 733,656 | Great Britain | July 13, 1955 |